Dec. 4, 1923.
1,476,541
D. McN. RAMSAY
CONDENSER FOR AIRCRAFT
Filed Feb. 3, 1922
4 Sheets-Sheet 3
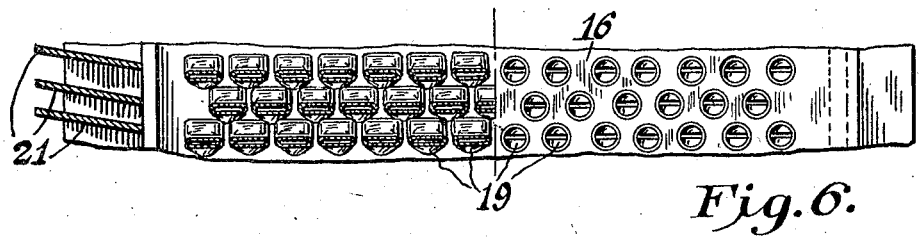
Fig.6.
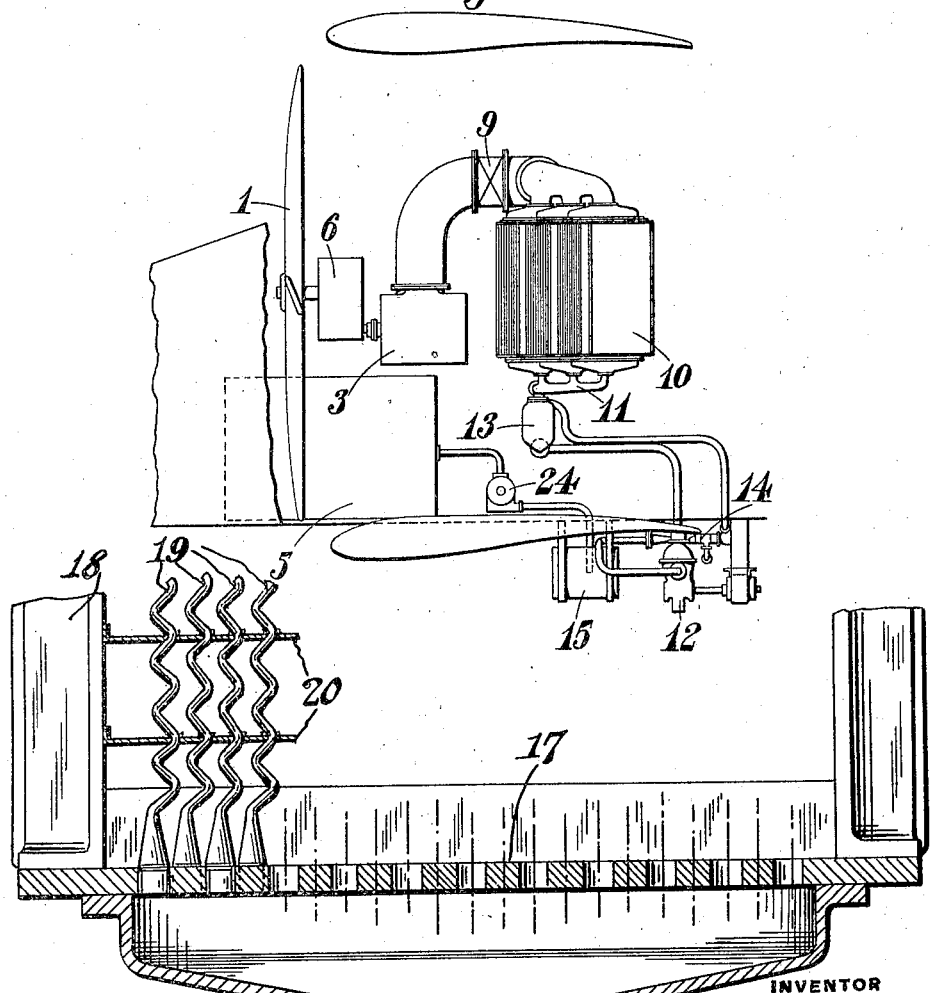
Fig.3.
Fig.5.

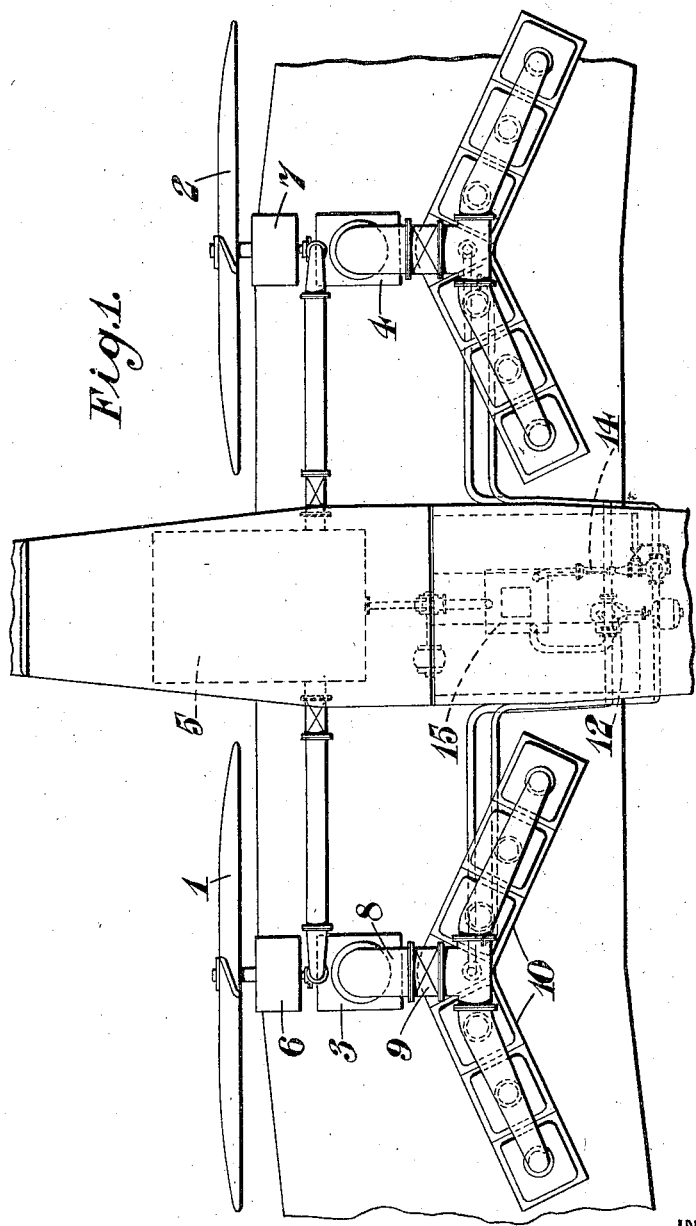

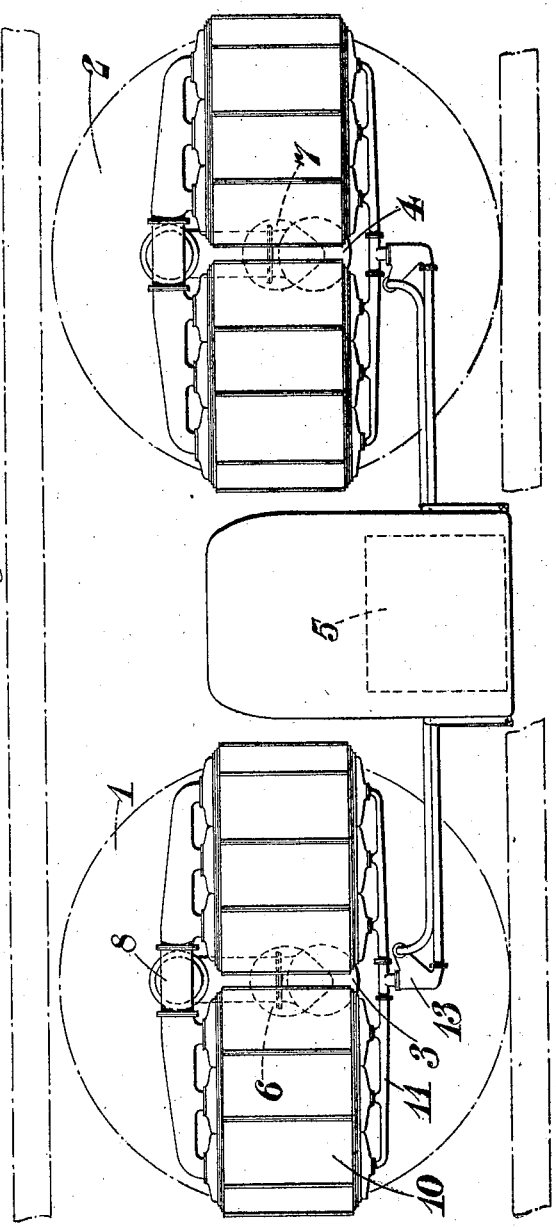

Patented Dec. 4, 1923.

1,476,541

UNITED STATES PATENT OFFICE.

DAVID McNAB RAMSAY, OF GLASGOW, SCOTLAND, ASSIGNOR TO THE RAMSAY CONDENSING LOCOMOTIVE COMPANY LIMITED, OF GLASGOW, SCOTLAND, A BRITISH COMPANY.

CONDENSER FOR AIRCRAFT.

Application filed February 3, 1922. Serial No. 533,757.

*To all whom it may concern:*

Be it known that I, DAVID McNAB RAMSAY, a subject of the King of England, residing at Glasgow, Scotland, have invented certain new and useful Improvements in Condensers for Aircraft, of which the following is a specification.

This invention consists in improvements in or relating to power plant for aircraft. At present aero-engines are generally of the internal combustion type, and the fuel employed is light motor spirit, such as petrol. It is desirable to provide for aircraft a power plant to enable any fuel to be used and to overcome the disadvantages of the internal combustion engine as such. Sir Hiram Maxim originally proposed to employ a reciprocating steam engine and steam generator, but the power which such plant develops for its weight is not sufficient for use in aircraft.

It is desirable to employ a steam turbine as the prime-mover. The power output of a steam turbine depends largely on the exhaust pressure, which is determined by the efficacy of the condensing plant to produce a high vacuum, and the employment of a turbine for use in aircraft is only possible by providing a condenser which, by its construction and its arrangement in the aircraft, will ensure the maintenance of a high vacuum without excessive weight, possibility of leakage or other disadvantages.

In the air-cooled condenser itself, it is essential to provide a large cooling area for a small weight, to reduce the air resistance to a practical minimum and to ensure the scouring of the cooling surface by the air stream, while avoiding the formation of cushions or pockets of comparatively still air.

According to this invention in an air-cooled condenser for aircraft steam power plant there is provided the combination with top and bottom headers of flat tubes extending between said headers and communicating therewith, the flat surfaces being arranged substantially parallel to the direction of flow of air through the condenser.

According to another feature of this invention, in an air-cooled condenser for aircraft power plant, there is provided the combination with top and bottom headers, of tubes (preferably seamless drawn tubes made of a metal of high heat conductivity, for example copper) having cylindrical ends for attachment to the headers, and having the intermediate portions flattened for the purposes set out above, the flat surfaces being arranged substantially parallel to the direction of flow of air through the condenser. The flat tubes may consist of sheet metal boxes (for example produced by bending a metal sheet back on itself and joining the meeting edges), said boxes each extending from front to back of the condenser.

In order to ensure positive contact between the working fluid and the internal walls of the tube, and to provide a maximum length of the tube and therefore a maximum cooling surface for a minimum over-all size of condenser, it is preferable, according to this invention, that the flattened tubes are corrugated at an angle to the plane in which they are flattened, that is to say, viewing the condenser in the direction of the stream of air, each tube shows a wavy edge.

The condensers are preferably made in batteries, each battery comprising inlet and outlet headers connected together by the tubes above described. The batteries can be readily connected together by transverse frame-members.

If a flat tube be disposed with its flat side exactly parallel with the stream of air, in the same way as a ship moves through water, a cushion of comparatively still air may be formed at the leading edge of the tube, or if a battery of flat tubes be disposed with the flat sides of the tubes exactly parallel with the stream of air, there may be a tendency to form a cushion of comparatively still air in front of the whole battery, and I prefer to arrange the tubes or the batteries of tubes so that the plane of flattening is slightly inclined to the stream of air where it strikes the condenser, so that the stream of air passing through the condenser is slightly deflected from the main slip-stream.

According to another feature of this invention, the various batteries forming one condenser are mounted in a framework in the form of a very wide letter V disposed on the trailing side of the propeller with the apex of the V in the axis of and facing the propeller, so that the flat tubes are inclined to the slip stream in the manner above described.

I find it advantageous to dispose the condenser at some little distance from the propeller in order to minimize the back pressure thereon due to the air resistance of the condenser. Preferably, the turbine is disposed between the propeller and the condenser.

In determining the surface necessary for the condenser, it is naturally necessary to consider the duty of the condenser under the most unfavourable conditions which arise when the aircraft (such as an aeroplane) has to rise from the ground in hot dry weather, and in this connection it will be noted that the arrangement of power plant above described has the advantage that when the turbine is started on the ground the flow of air is immediately set up through the condenser as soon as the propeller is set in motion, without waiting for the aircraft itself to get into motion, and the necessary vacuum is thus created to enable the turbine to develop full power.

In the accompanying diagrammatic drawings which illustrate one construction and arrangement of condenser and power plant as applied to an aeroplane—

Figure 1 is a plan view of a portion of an aeroplane fitted with steam power plant according to this invention, the top plane being removed.

Figure 2 is an elevation of same looking from the rear, and

Figure 3 is a side elevation.

Figure 5 is a central sectional elevation of the lower portion of same but in a plane at right angles thereto, and Figure 6 is a fragmentary sectional view on the line 6—6 of Figure 4 looking in the direction of the arrows thereon.

Figure 4:
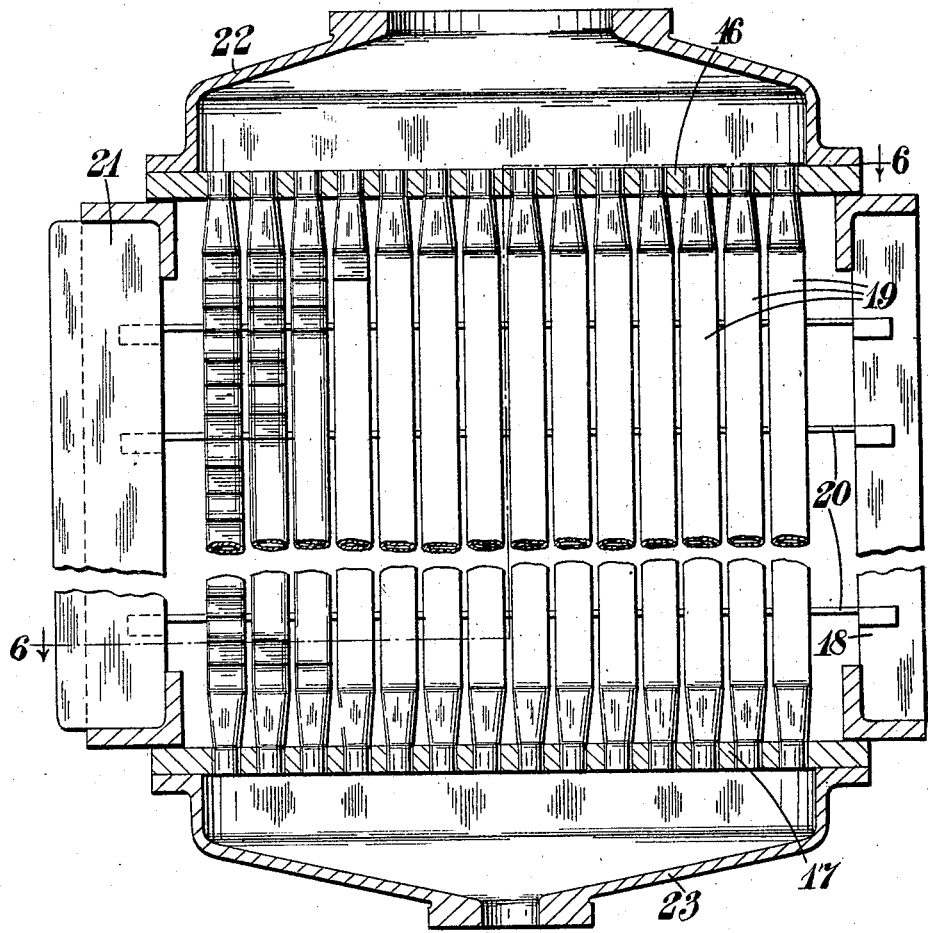
Figure 4 is a central sectional elevation of one of the condenser batteries, the middle portion being broken away.

The aeroplane is provided with two propellers 1—2, driven separately by steam turbines 3 and 4 respectively, arranged one on each side of the fuselage, and mounted between the wings of the machine. Conveniently, the boiler 5 is arranged opposite the turbines so that the steam can be conveyed to each of them by a straight-pipe connection extending laterally from the boiler and provided with flexible or other suitable joints. Each turbine is coupled to its propeller, preferably through a reduction gear indicated at 6—7, so that it is possible to use a high-speed turbine and a low-speed propeller, as is desirable from the point of view of efficiency and low weight. The propellers are of the tractor type, and each turbine is arranged immediately behind its propeller, and behind each turbine the battery of condensers allocated to it are mounted in any suitable framework.

As the turbine and its associated parts are merely duplicated on each side of the fuselage of the machine, the description hereinafter will refer only to one of them.

The exhaust steam from the turbine passes, through a pipe 8 of suitable dimensions for the low-pressure steam, upwardly and rearwardly past an atmospheric exhaust valve 9 to the headers for the condenser 10. This condenser is built up of two sets of three of the batteries hereinbefore referred to. These batteries are mounted in a suitable framework, and are disposed three on each side of the centre line of the turbine, the three batteries each being in line and inclined slightly backwards as clearly indicated in Figure 1, so as to present the apex of a V of broad angle towards the front of the machine. The apex of the V conveniently lies in the same vertical plane as the axis of the turbine end of the propeller which it drives. The headers distribute the exhaust steam to the tubes of each of the batteries, and on the passage of the steam through the tubes of these batteries it is condensed. The water flows to the bottom header of each battery and thence into a trunk pipe 11 which is connected to the water-extraction pump 12. In the connection between the trunk 11 aforesaid and the water-extraction pump, there is provided a separating chamber 13, the lower portion of which is connected to the water-extraction pump, and the upper portion of which is connected to an ejector 14 which extracts any air or gases, so that the water-extraction pump has to deal only with liquid. The ejector 14 discharges the gases and its own steam into the hot-well 15, and the water-extraction pump, which is preferably a centrifugal high-speed pump, also delivers the condensed water to the hot-well. A boiler feed-pump is indicated at 24.

The batteries of condensers are constructed as hereinbefore described, each battery see Figures 4—6 comprising an upper and a lower tube-plate 16 and 17 respectively which are connected together by suitable frame-members 18; the tubes 19 are mounted in the tube-plates in any desired manner, so as to give an airtight joint to prevent the leakage of air into the interior of the condenser. It is desirable that this leakage should be reduced to a minimum in order to maintain a high vacuum and ensure a large power output from the turbine, but if any air leakage does take place in any part of the vacuum system, the air is extracted from the condenser and discharged by means of the ejector 14 aforesaid. Headers 22 and 23 are provided at the top and bottom respectively of each battery.

In the construction of the condenser the tubes 19 are flattened and corrugated, as hereinbefore described, and secured in the tube-plates 16 and 17. They may be braced immediately of their ends by means of plates 20 secured to the side frame-members 18 of the battery in order to prevent any vibration, which would tend to loosen them in the tube-plates.

Preferably there is arranged on the leading face of each condenser-battery a number of vertical vanes 21 which are set at an angle to the plane of flattening of the tubes 19, so that when the batteries are built up to form a condenser of V-shape, as hereinbefore described, the vanes each lie in a plane parallel with the stream of air and thus serve to direct the air through the condenser and onto the tubes thereof.

Preferably aluminium or some light alloy is used for the tube plates into which the flat tubes or boxes are secured in any suitable manner.

As it is possible to use sheet metal of lighter gauge than that of seamless drawn tubes, a condenser of less weight can be produced with this type of tube and also at less cost.

It will be appreciated that various modifications may be made in the mechanical details of construction of the power plant according to this invention. Thus, for example, an aeroplane or other aircraft may be provided with only a single propeller and turbine, and any desired type of turbine which gives the desired power output with the requisite low weight may be used. The mounting of the various parts in the machine may also be varied as to construction, arrangement and disposition, according to the requirements in each particular case.

It will be understood that the construction and arrangement of the steam generator and hot-well, and fuel tanks and burners, form no part of my present invention, but these may be mounted in the fuselage of the machine.

What I claim as my invention and desire to secure by Letters Patent is:—

1. In an air-cooled condenser for aircraft steam power plant, a condenser unit comprising a top header, a bottom header, a plurality of tubes having cylindrical ends for attachment to said headers and having intermediate portions flattened in one plane and corrugated so that the ridges of the corrugations extend across the flattened sides of the tubes transversely to the length thereof and arranged with the flat sides substantially parallel to two opposite sides of the condenser unit, and fixed air deflecting plates mounted on that one of the other sides of the unit which constitutes the leading face of the unit, said plates extending in the direction of the length of the tubes but at an angle to the plane of flattening thereof.

2. An air-cooled condenser for aircraft steam power plant, comprising a plurality of self-contained condenser units each having a top header, a bottom header, a plurality of tubes having cylindrical ends for attachment to said headers and having the intermediate portions flattened in one plane and corrugated so that the ridges of the corrugations extend across the flattened sides of the tubes transversely to the length thereof and arranged with the flat sides substantially parallel to two opposite sides of the condenser unit, and fixed air deflecting plates mounted on that one of the other sides of the unit which constitutes the leading face of the unit, said plates extending in the direction of the length of the tubes but at an angle to the plane of flattening thereof, all of said units being connected together in the form of a wide V with the said deflecting plates on the leading faces parallel to the line which bisects the angle at the apex of the V.

3. An air-cooled condenser for aircraft steam power plant, comprising a plurality of self-contained condenser units each having a top header, a bottom header, a plurality of tubes having cylindrical ends for attachment to said headers and having the intermediate portions flattened in one plane and corrugated so that the ridges of the corrugations extend across the flattened sides of the tubes transversely to the length thereof and arranged with the flat sides substantially parallel to two opposite sides of the condenser unit, fixed air deflecting plates mounted on that one of the other sides of the unit which constitutes the leading face of the unit, said plates extending in the direction of the length of the tubes but at an angle to the plane of flattening thereof, all of said units being connected together side by side in two rows with the leading faces of the units in each row in line, said rows of units forming a wide V with the said deflecting-plates on the leading faces of the units parallel to the line which bisects the angle at the apex of the V, a steam manifold having a plurality of connections for communication with the top header of each unit in each row, and a condensate tube having a plurality of connections for communication with the bottom header of each unit in each row.

In testimony whereof I affix my signature.

DAVID McNAB RAMSAY.